United States Patent
Monnerat et al.

(10) Patent No.: US 11,594,886 B2
(45) Date of Patent: Feb. 28, 2023

(54) POWERING AN INFORMATION DELIVERY NETWORK

(71) Applicant: Comcast Cable Communications, LLC, Philadelphia, PA (US)

(72) Inventors: Edward David Monnerat, Highlands Ranch, CO (US); Nicholas Adam Pinckernell, Littleton, CO (US); Jonathan Alan Leech, Denver, CO (US); Andy Martushev, Castle Rock, CO (US); Scott Moody, Colorado Springs, CO (US); David B. Leach, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 707 days.

(21) Appl. No.: 14/836,377

(22) Filed: Aug. 26, 2015

(65) Prior Publication Data

US 2017/0063086 A1    Mar. 2, 2017

(51) Int. Cl.
| | |
|---|---|
| G06Q 20/00 | (2012.01) |
| H02J 3/00 | (2006.01) |
| G06F 1/26 | (2006.01) |
| G05B 15/02 | (2006.01) |
| G06Q 50/06 | (2012.01) |

(52) U.S. Cl.
CPC ............ *H02J 3/0073* (2020.01); *G05B 15/02* (2013.01); *G06F 1/26* (2013.01); *G06Q 50/06* (2013.01)

(58) Field of Classification Search
CPC .... H02J 1/00; H02J 3/00; G05B 15/02; G06F 1/26; G06Q 50/06

USPC .................................................... 705/35–45
See application file for complete search history.

(56) References Cited

U.S. PATENT DOCUMENTS

| | | | | |
|---|---|---|---|---|
| 2002/0121963 | A1* | 9/2002 | Kline | H02G 11/02 370/490 |
| 2009/0094173 | A1* | 4/2009 | Smith | G01R 21/1335 705/412 |
| 2014/0199990 | A1* | 7/2014 | Wolcott | H04W 92/06 455/422.1 |
| 2015/0029869 | A1* | 1/2015 | Wolcott | H04L 43/50 370/242 |
| 2015/0227182 | A1* | 8/2015 | Teeter | G06F 1/263 713/300 |

OTHER PUBLICATIONS

"Coaxial Power Cable for DC Power Transmission", Bob Stowe, dated Feb. 23, 2011. (Year: 2011).*
European Search Report—EP Appl. 16185677.8—dated Jan. 23, 2017.
Power Systems for Coaxial Cable.
Oct. 28, 2022—CA Office Action—CA App. No. 2,939,889.

* cited by examiner

*Primary Examiner* — Hai Tran
(74) *Attorney, Agent, or Firm* — Banner & Witcoff, Ltd.

(57) ABSTRACT

Methods and systems are disclosed for leveraging user premises supplied electric power to power active components in an information delivery network. In response to one or more conditions, an active component may switch an input power path from using grid-supplied or battery power to draw power from a user premises. The decision to switch the power path may be based on a number of conditions, for example, whether power is available from the grid, the relative cost of power from the user premises and whether the power from the user premises includes power from a renewable source.

26 Claims, 7 Drawing Sheets

POWERING AN INFORMATION DELIVERY NETWORK

BACKGROUND

An information delivery network may include a number of active components to enable the delivery of services to users. Traditionally, these active components receive electric power from a power grid, supplied by an electric generating station. A power grid may be subject to regional outages, for example, due to weather related issues or due to the failure of a component in the grid, such as a transformer. When a power outage occurs, active network components may continue to be powered by backup batteries, but these batteries provide a limited amount of power and can drain quickly, leaving the active components without power, and causing an interruption in services on the information delivery network.

In recent years, it has become more common for households to generate their own electric power, for example, via renewable sources. In addition, households may be able to choose a supplier of electric power from a competitive marketplace, thereby having access to electric power pricing that may differ from the pricing available or in use by the operator of the information delivery network.

SUMMARY

The following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In some aspects of the disclosure, active components in an information delivery network may determine to receive electric power from a user premises. In some embodiments, the power received from the user premises may be provided, by the active component, to other active components in the network. In an embodiment, an active component may communicate with another device to obtain information for use in determining a power input path.

In some embodiments, the determining of a power input path may be based on a price of power available from a user premises. In some embodiments, the determining may be based on whether or not the power available from a user premises includes power from a renewable source. In some embodiments, the determining of the power input path may be in response to a lack of power from a portion of the power grid.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
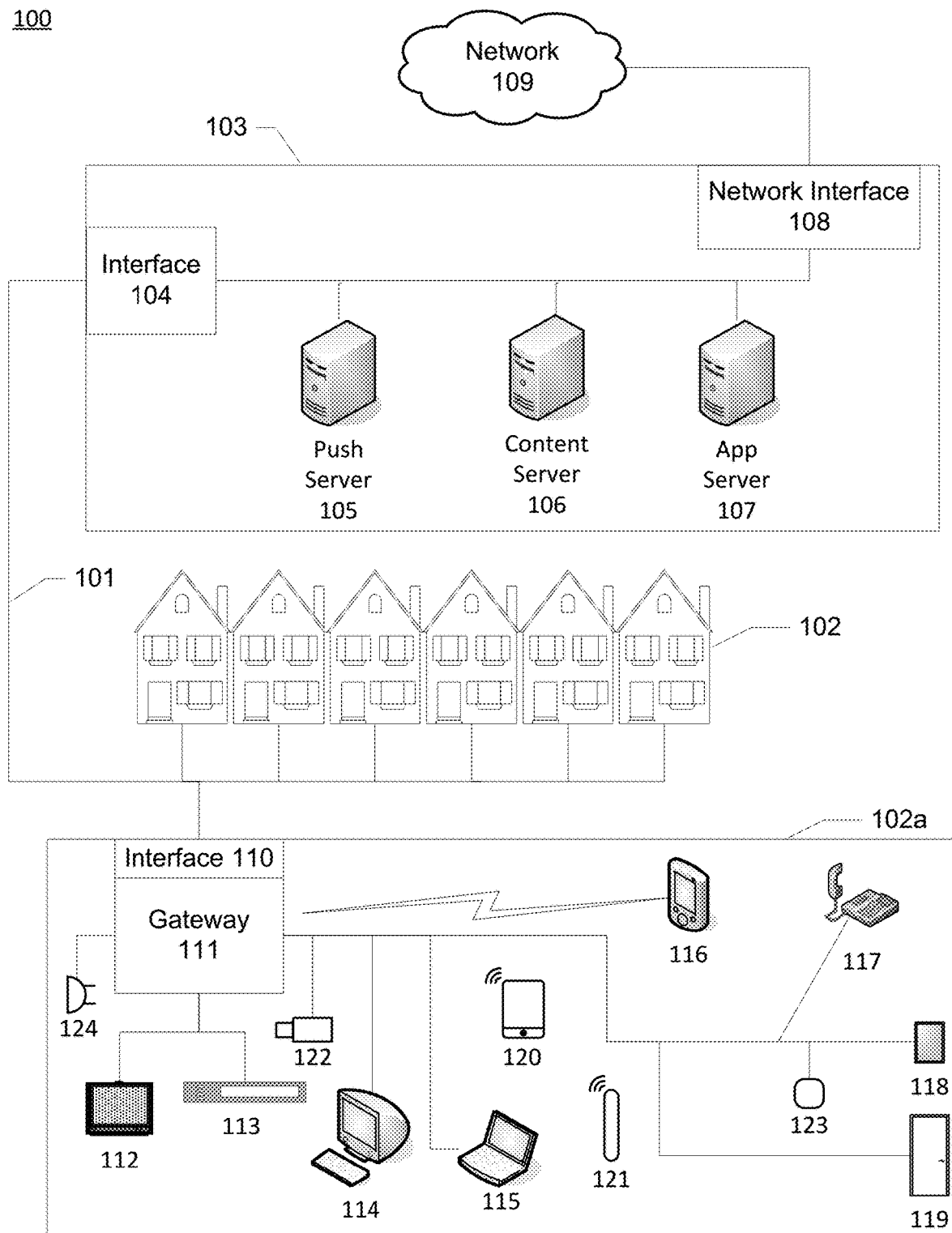
FIG. 1 illustrates an example information access and distribution network in accordance with one or more aspects as described herein.

FIG. 1 illustrates an example information distribution network 100 on which many of the various features described herein may be implemented. The network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS), for example a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, audio, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user media habits and collecting that information for use in selecting advertisements. Another application server may be responsible for formatting and inserting advertisements in a video stream and/or content item being transmitted to the premises 102. It should be understood by those skilled in the art that the same application server may be responsible for one or more of the above listed responsibilities.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway interface device 111 may be a set-top box (STB), digital video recorder (DVR), computer server, or any other desired computing device. The gateway interface device 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, door home security sensors 119, tablet computers 120, personal activity sensors 121, video cameras 122, motion detectors 123, microphones 124, and/or any other desired computers, sensors, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
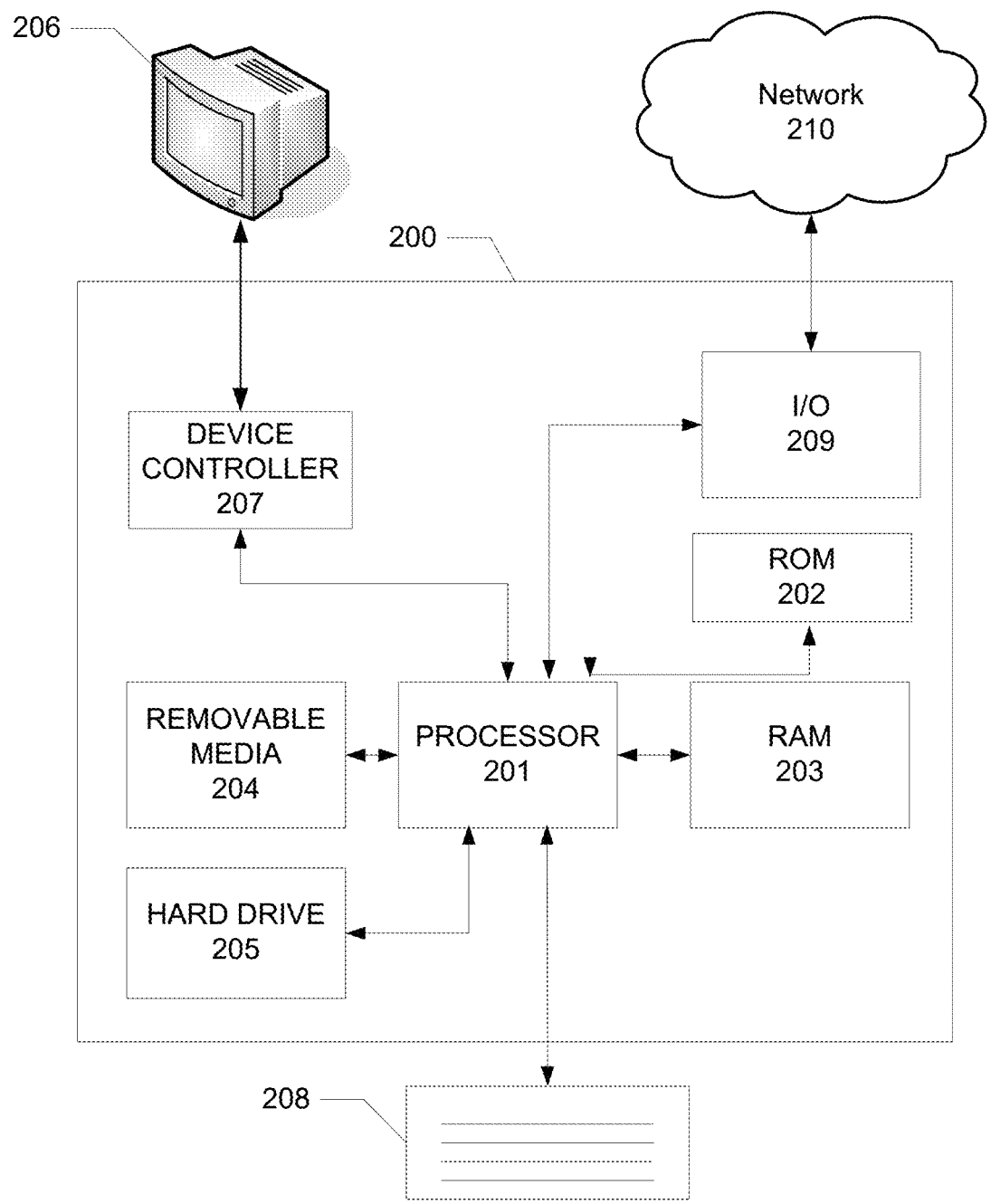
FIG. 2 illustrates an example computing device that may be used to implement any of the features and devices described herein.

FIG. 2 illustrates general hardware elements of an example computing device 200 that can be used to implement any of the elements discussed herein and/or illustrated in the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
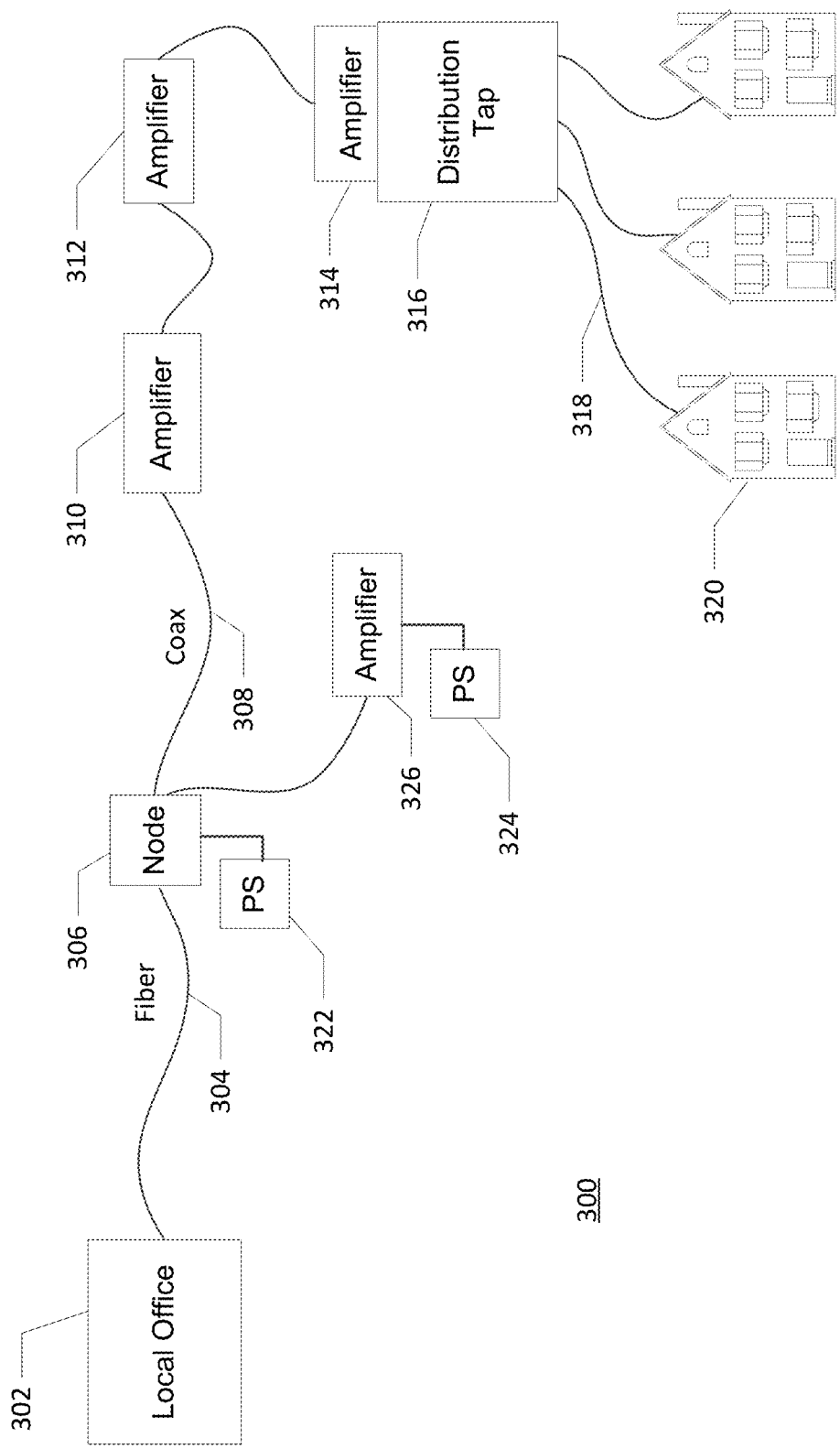
FIG. 3 illustrates an example network configuration in accordance with one or more aspects as described herein.

FIG. 3 illustrates an example network configuration 300 as may be found in the network 101 of FIG. 1. Content or other information may be communicated between a local office 302, such as local office 103 of FIG. 1, and equipment at a user premises 320, such as the premises 102 of FIG. 1. In some network configurations, one or more optical fiber lines 304 may be used to transmit communications between the local office and other network components. In some configurations, coaxial cables may be used, rather than, or in addition to, optical fiber lines. The optical fiber line 304 may terminate at an optical node 306, where optical signals carried by the optical fiber line may be converted to electrical signals for transmission over one or more coaxial cables 308 toward a user premises 320. In some networks, the coaxial cable may connect directly to a user premises. Various components may be positioned in the network between the optical node and the user premises. For example, an information delivery network may employ one or more signal amplifiers 310, 312, and 314, along the coaxial cable between the optical node and the user premises in order to maintain a particular signal level for digital services. In addition, a distribution tap 316 may distribute the signals to one or more user premises 320 via one or more coaxial cables 318.

Many of these network components require electric power in order to operate. For example, signal amplifiers typically require electric power. Some distribution taps, for example, an addressable tap, may require electric power. In existing systems, these components may receive power from the power grid, often supported by a battery backup. As shown in FIG. 3, an optical node 306 may receive electric power via a power supply 322, which may receive power from the grid. Similarly, signal amplifier 326 may receive electric power via the power supply 324, which may get power from the grid.

In some networks, active components may draw power from energy transmitted along the coaxial cable itself. In these networks, grid power is typically converted to 60 volts alternating current (VAC) or 90 VAC at a frequency of 60 Hz and supplied to the coaxial cable by a source at the optical node 306, such as by the power supply 322. In these networks the power may be transmitted on the center conductor of the coaxial cable from the optical node downstream to in-line devices, such as the signal amplifier 312, the distribution tap 316 and to devices at the user premises, such as telephony equipment or a network interface device. In some networks, banks of batteries or backup power generators may be located at the optical node 306 to supply power in the event that grid power is lost.

Figure 4:
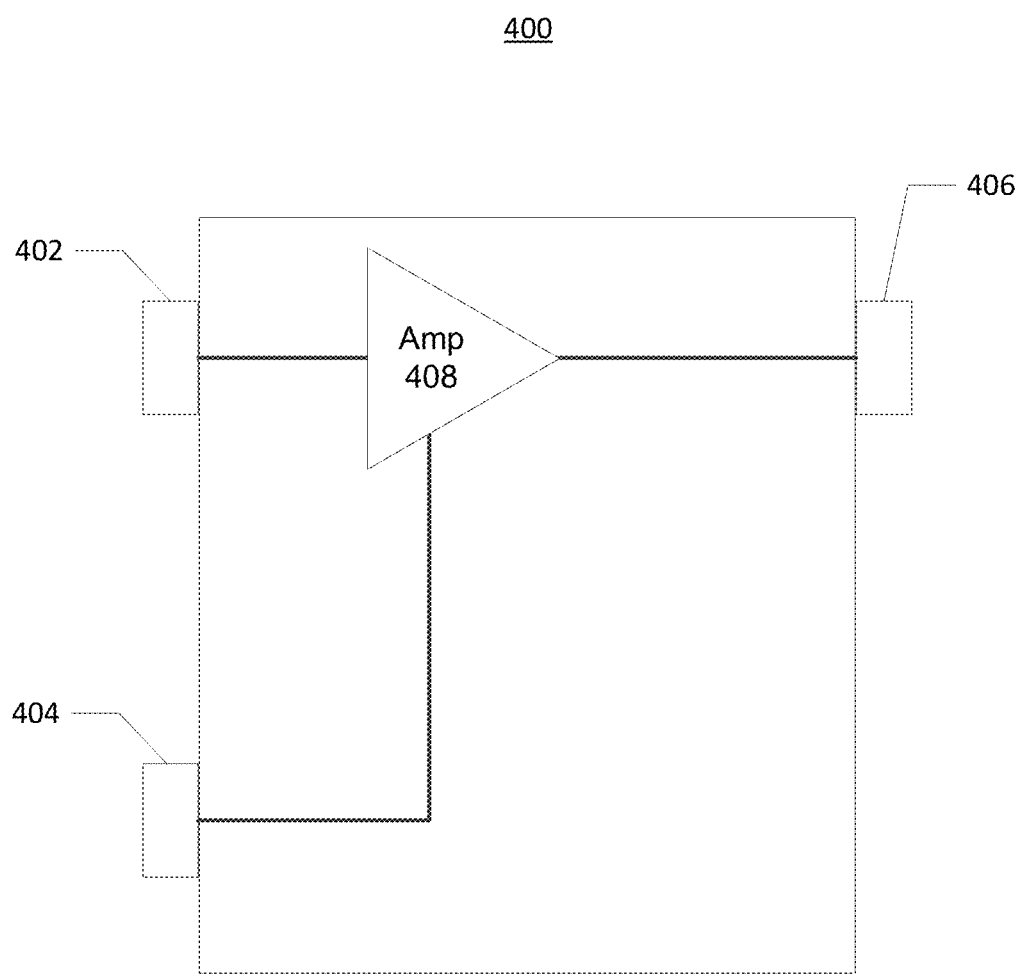
FIG. 4 illustrates a signal amplifier in accordance with one or more aspects as described herein.

FIG. 4 illustrates an example signal amplifier 400 in accordance with one or more aspects as described herein. A content signal received via the signal input port 402 may be boosted (amplified) by the amp 408 and transmitted out via the signal output port 406. In the example signal amplifier shown, grid power may be supplied to the signal amplifier via the power port 404. Some signal amplifiers may receive power via the signal input port 402. The signal amplifier 400 may transmit a portion of the power received to the signal output port 406 for use by other active components downstream.

Figure 5:
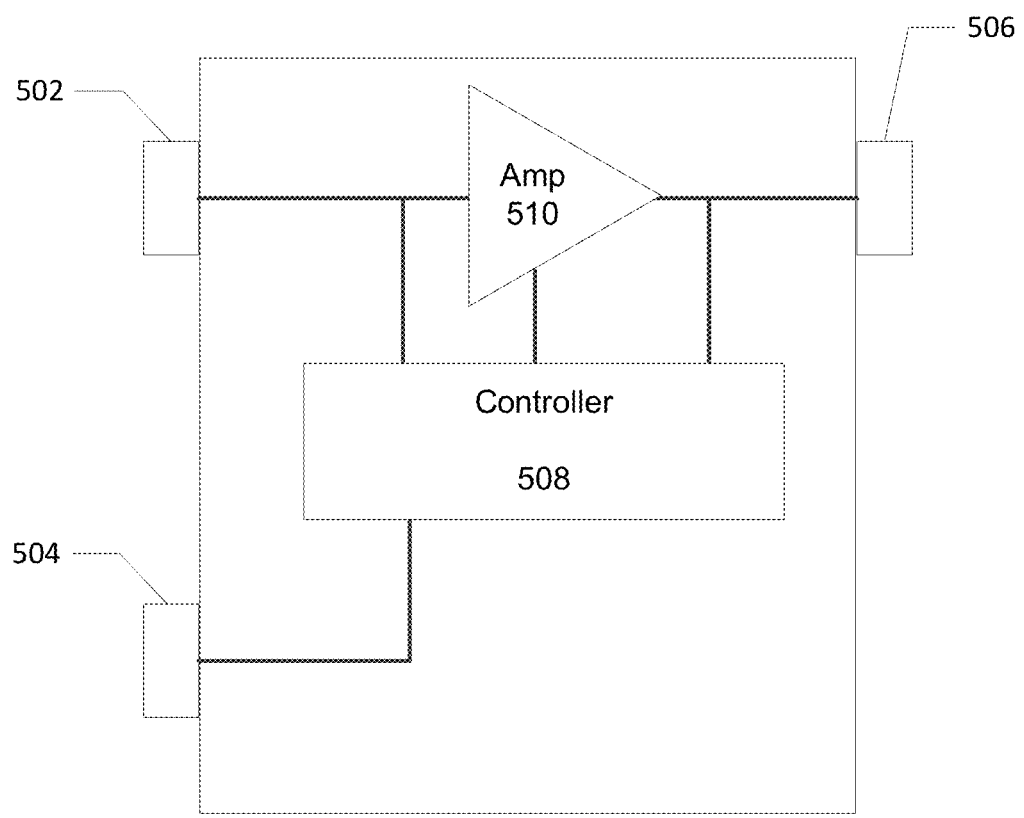
FIG. 5 illustrates another example signal amplifier in accordance with one or more aspects as described herein.

FIG. 5 illustrates another example signal amplifier 500 in accordance with one or more aspects as described herein. In the example shown, the signal amplifier 500 may include a signal input port 502, a signal output port 506, a power input port 504, an amp 510 and a controller 508. In some embodiments, the power input port 504 may be omitted. In some embodiments, the controller 508 may include a processor, memory, voltage level detecting circuitry, power metering circuitry, power switching circuitry and/or other components. The controller 508 may detect the state of power (for example, availability, quality or reliability) at one or more of the ports (502, 504, 506) and control power flow based on the detection, as discussed below in relation to FIG. 6. The signal amplifier of FIG. 5 is presented in a simplified illustration in order to facilitate ease in understanding. It should be understood by those skilled in the art that other configurations including various components may implement the methods as described herein.

In some embodiments, when the signal amplifier is receiving power via the power input port 504 and the controller 508 detects sufficient power on the signal input port 502, the controller may determine to draw power via the signal input port 502. This may be preferred by a network operator, for example, due to cost factors.

In some embodiments, when the signal amplifier is receiving power via the signal input port 502 and the controller 508 detects a loss of power, insufficient power or otherwise unreliable power at the signal input port 502, the controller may determine to draw power from the power port 504 or from the output port 506. In some embodiments, the controller 508 may determine to draw power from the power port 504 based on the availability of power from that port.

In other embodiments, when the signal amplifier is powered by either the power port or the signal input port and if the controller 508 detects sufficient power on the output port 506, the controller may determine to receive power from the output port 506.

In some embodiments, the power received from any port may further be provided out another port. For example, a portion of the power received from the output port 506 may be directed to the power port 504 in order to charge a battery.

In still other embodiments, when power may be available from multiple ports, the controller 508 may determine to draw power from more than one port, thereby sharing the loading and reducing a power requirement at any one of the ports. For example, it may be advantageous to power the signal amplifier from both the signal input port 502 and the signal output port 506.

In some embodiments, the controller 508 may be configured with a preference for receiving power from a particular port or ports. In some embodiments, the preference may consist of an ordered list, representing the ports in order of preference. Various conditions may lead an operator of a network to prefer power to be drawn from a particular port. For example, a particular port may be connected or otherwise configured to receive power from a preferred source, such as an operator managed source, a less expensive source, or a source including renewable energy. In various embodiments, a number of parameters may be configured in the memory of the controller 508, including an indication as to whether the power available at a particular port includes power from a renewable source, the cost of the power available on the port, and/or a limit to the amount of power that may be drawn from the port. In some embodiments, the controller 508 may be configured to receive power from a particular port for a predetermined time period, for example during business hours or during off-peak grid power usage periods or based on a day of the week.

In some embodiments, the controller 508 may include communication capabilities to enable communication with external devices, for example to coordinate the flow of power. In some embodiments, the controller 508 may communicate with a coordinating device, for example, with a network device that manages power within the network. In some embodiments, the controller 508 may communicate with another signal amplifier. Communication may be via the coaxial cable at the input port 502 and/or the output port 506. In some embodiments, the communication may be via a separate communication port (not shown) or via wireless communications, such as Wi-Fi or other wireless standard. In some embodiments, the signal amplifier may communicate with the next active component upstream, via the input port 502, to inform the active component to cease drawing power from the power grid and to instead draw power from the coaxial cable.

In some embodiments, the controller 508 may communicate with equipment at a user premises to receive information about the power available from the user premises. For example, information such as the cost of power from the user premises or whether or not the power available from the user premises includes power from a renewable source may be received.

In some embodiments, the cost of power available from a user premises may vary, for example, based on a real time pricing plan. In such embodiments, the information may include estimated energy pricing at various times of a day. In some embodiments, a user premises may receive power at a price different from the price paid by the network operator for power from the grid. For example, in some locations, users may be able to purchase power for their premises from various electric power suppliers. The price from their chosen supplier may be less than the price the operator pays for power. In some embodiments, the difference in price between the user premises supplied power and the network operator's grid supplied power may vary based on the time of day or on other factors, such as a current loading of the grid or a real time pricing methodology. In some embodiments, the controller 508 may communicate with external devices or networks in order to obtain real time pricing. In some embodiments, communication between the controller 508 and equipment at the user premises may conform to a MOCA standard.

Upon receiving information about the power availability from the user premises, various internal, external or network operator supplied data may be consulted by the controller to compare preferences for power with certain fixed data, such as the cost of network operator grid power. In some embodiments, the controller may compare the cost of the operator supplied power with the rate (cost) from the user premises and select to receive power from the less expensive source. In some embodiments, the controller 508 may continue to monitor ports and communications over time to best manage power to meet a particular goal, for example, minimizing power costs, maximizing the use of renewable energy or attaining a reliability metric.

In some embodiments, a battery level may be evaluated in conjunction with the decision by the controller 508 as to which port to draw power from. For example, an operator may prefer to power active components, such as the signal amplifier 500, with grid supplied power, as long as it is available. After a loss of grid supplied power, active components may receive power from a battery backup supply. In such examples, the controller 508 may be configured to draw power from the battery backup supply until a particular battery level is reached, at which time the controller may switch to receive power from a user premises, via the signal output port 506.

In some embodiments, the controller may measure or otherwise track a quantity of power drawn via the signal output port 506. The quantity of power may be later used during billing, for example to pay the user for the power consumed from the user premises or to provide other benefits to the user, such as discounted use of the information delivery network or a discount on services provided by the network.

In some embodiments, the instantaneous power drawn from the user premises may be limited so as to not overload the equipment or the lines that carry the power. The acceptable power limit may be communicated between the user premises and the controller or the limit may be pre-configured.

Although a signal amplifier has been discussed above, it should be understood by those skilled in the art that other active components in the information delivery network may perform the methods as described herein. For example, a distribution tap 316 may include a controller and may perform methods including receiving power via a signal output port from a user premises, switching power flow via various ports and communicating power parameters and control with other components in the network and/or at the user premises.

Figure 6:
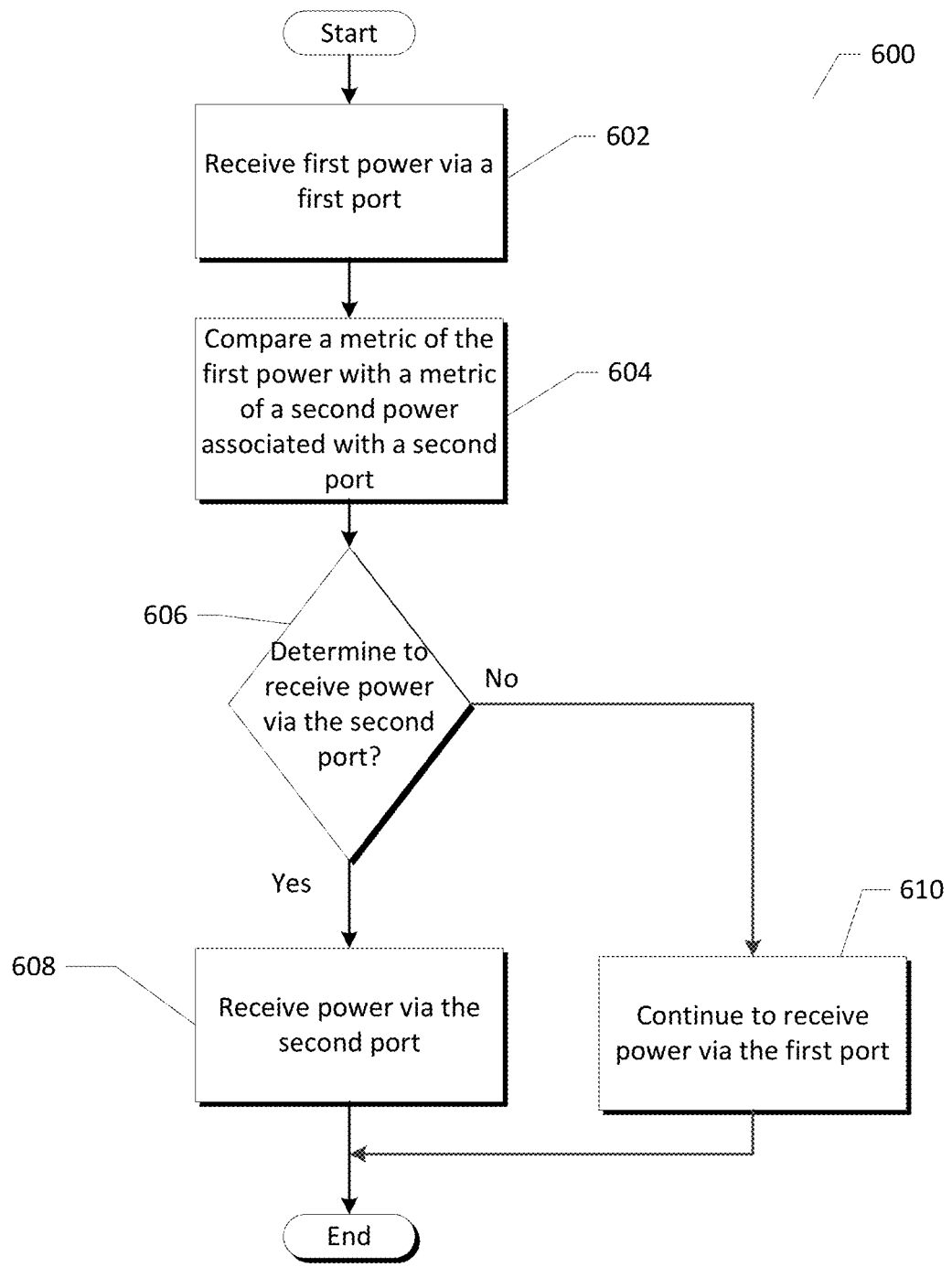
FIGS. 6-7 are example flow charts illustrating methods performed in accordance with one or more aspects as described herein.

FIG. 6 is an exemplary flow diagram illustrating an example method 600 in accordance with one or more disclosed features described herein. In one or more embodiments, the method illustrated in FIG. 6 and/or one or more steps thereof may be performed by one or more computing devices (e.g., the signal amplifier 500, the distribution tap 316, and the like). In other embodiments, the method illustrated in FIG. 6 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 602, electric power may be received via a first port. For example, the electric power may be received via a power port (such as power input port 504 of FIG. 5) which may ultimately come from the electric supply grid at a standard frequency and voltage, such as 120 volts at 60 Hz. In other embodiments, the first port may be an upstream communication port (such as the signal input port 502 of FIG. 5) and the power received via the first port may be at 60 to 90 volts at a frequency of approximately 60 Hz. At step 604, a first metric associated with the electric power received via the first port may be compared with a second metric associated with electric power that may be available via a second port. At step 606, it may be determined whether to receive power from a second port. If it is determined to receive power via the second port, the method may continue to step 608 where power may be received via the second port.

In some embodiments, the second port may be a downstream communication port (such as the signal output port 506 of FIG. 5). In some embodiments, the determination as to whether to receive power from the first port or the second port may be based on a comparison of the cost of electric power available on the first port and the cost of electric power available on the second port. In such embodiments, the decision to receive electric power via the second port may be in response to determining that the cost of the electric power available on the second port is less than the cost of the electric power available on the first port. The cost of power available via any of the ports may be made known using various techniques. For example, the costs may be communicated via wired or wireless methods. In some embodiments, the costs may be pre-configured. In other embodiments, a prediction of the relative costs may be made and configured into the device.

In some embodiments, the determination as to whether to receive power from the second port may be based on whether the electric power available via the second port includes power from a renewable source. In such embodiments, the switching to receive electric power via the second port may be in response to determining that the electric power available via the second port includes power from the renewable source. In some embodiments, the renewable source may include solar energy, wind energy or thermoelectric energy.

If it is determined at step 606 to continue to receive power via the first port, then the method may continue at step 610 where power may continue to be received via the first port.

In some embodiments, the electric power received via the second port may be received from a user premises. For example, a device, such as the gateway interface device 111, the set-top box 113, the interface 110, and the like, at the user premises may supply power to the second port.

In some embodiments, the determination to receive power from the second port may be based on receiving a communication indicative of a command to receive electric power via the second port. For example, a command may be received which specifies the port should be used for receiving power. In some embodiments, the power flow in the information delivery network may be controlled and/or coordinated from a remote location. In such embodiments, one or more commands may be received by various devices in the network to configure those devices to draw power from one or more ports.

In some embodiments, a quantity of power drawn from the second port may be measured. In such embodiments, data indicative of the power usage quantity may be communicated to another device, for example to aid in billing for the power used.

In some embodiments, responsive to receiving electric power on the second port, electric power may be provided (output) via the first port. In these embodiments, electric power provided (output) via the first port may be limited, for example, based on a pre-configured parameter.

In some embodiments, the methods as described herein may be performed by a signal amplifier or a tap. In some embodiments, when the methods are performed by a signal amplifier, electric power may initially be received via a first port, for example a signal input port or a power input port. In some embodiments, it may be determined to receive electric power via a second port, such as an amplified signal output port.

In some embodiments, the determination as to whether to receive power from the second port may be based on a price of the electric power available via the second port. For example, a port may be selected for receiving power in order to save on the cost of powering one or more devices. In some embodiments, the decision may be based on a time schedule. For example, in cases where a user premises is on a real time pricing power plan, power may be significantly less costly than a fixed rate price during certain hours of the night. In this example, a user may allow power to be transmitted from their premises into the information delivery network for use in powering active components. For example, signal amplifier may be configured to draw power from a particular port supplied by power from the user premises during the night.

In other embodiments, the determination as to whether to receive power from the second port may be based on a source of the electric power available via the second port. For example, it may be preferred by the network provider to use "green energy" or energy from one or more renewable sources. Various methods may be used to determine whether power on a particular port includes power from a renewable source. For example, by the mere presence of power on a certain port, it may be assumed that the power includes power from a renewable source, for example, by configuration. In some embodiments, the device may receive a communication to indicate that a particular port has available power from a renewable source.

In other embodiments, the determination as to whether to receive power from the first port or the second port may be based on a command. For example, a device in a remote location may command various other devices in the information delivery network to draw power from a particular port or ports. In some embodiments, the controller may configure various network branches to draw power locally, for example, from one or more user premises. In such embodiments, the various network branches may be configured to operate within power usage limits whereby user equipment may support the usage without overloading.

In some embodiments, electric power may be provided out via the first port. In other words, power may be received via the second port and some or all of the received power may be transmitted out via the first port. In some embodiments, the first port may be connected to a battery and the power may be used to charge the battery. In other embodiments, the first port may be an upstream communication port and the power supplied out via the first port may power one or more active components upstream.

In some embodiments, the determination as to whether to receive power from the first port or the second port may depend on receiving a communication relating to a power parameter.

In some embodiments, an active component, such as the signal amplifier 500, may request or negotiate for electric power, for example, via communications on the second port. For example, a negotiation may take place between the active component and equipment at a user premises. The negotiation may include an exchange of pricing information, schedule information or information about whether the energy available from the user is from a renewable source.

Figure 7:
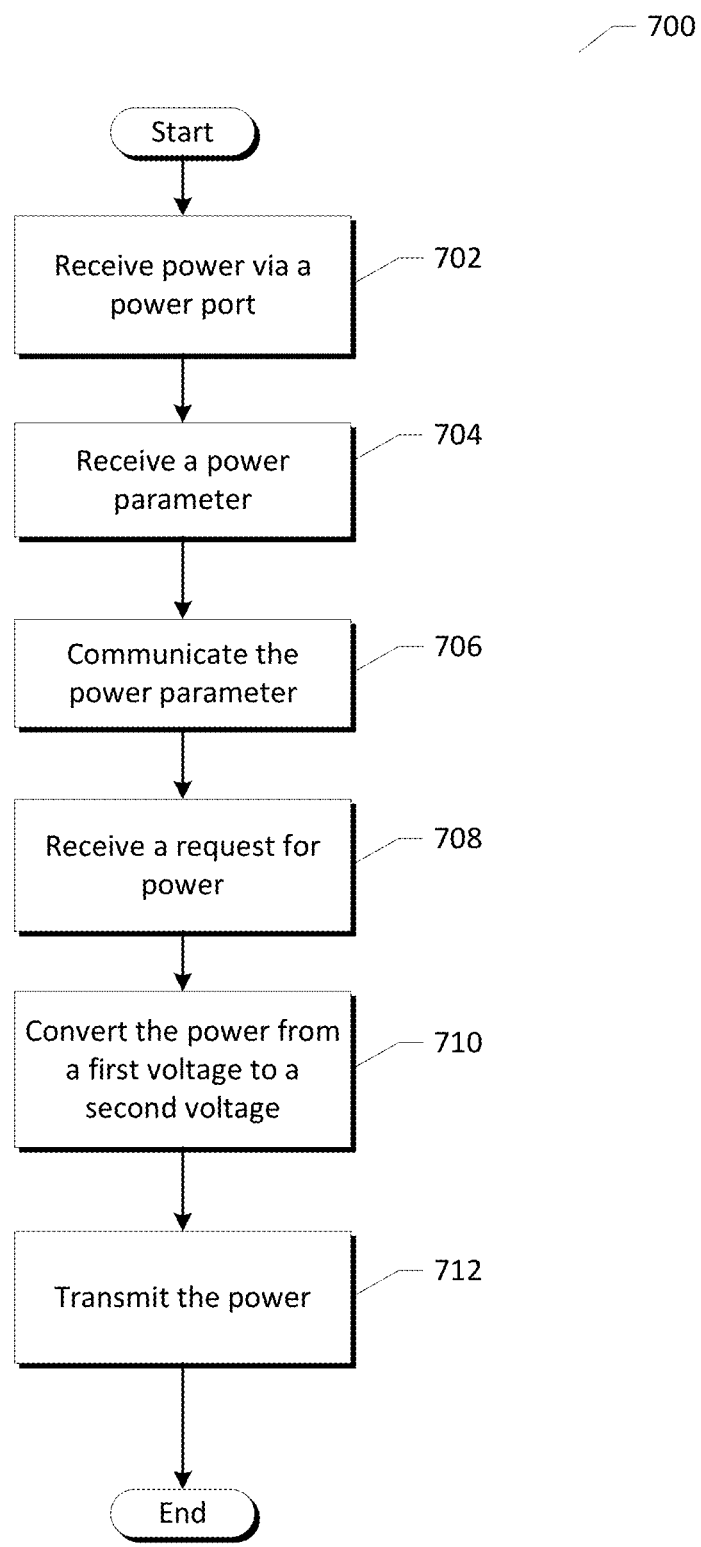

FIG. 7 is an exemplary flow diagram illustrating an example method 700 in accordance with one or more disclosed features described herein. In one or more embodiments, the method illustrated in FIG. 7 and/or one or more steps thereof may be performed by one or more computing devices (e.g., the gateway interface device 111, the set-top box 113, the interface 110, and the like). In other embodiments, the method illustrated in FIG. 7 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 702, electric power may be received via a power port. For example, the electric power may be power from the electric supply grid or the electric power may be from a renewable source, such as a wind generator. At step 704, a power parameter may be received. In some embodiments, the power parameter may be indicative of the source of power that is being received in step 702. In other embodiments, the power parameter may provide information about a limit to the amount of power which may be supplied to another device. The power parameter may be configured or provided via a user interface. At step 706, the power parameter may be communicated to another device.

At step 708, a request for power may be received. At step 710, the power received at step 702 (via the power port) may be converted to a form suitable for sending to the second device or to a form suitable for a particular type of network, such as an information delivery network. In some embodiments, the power may be converted from 120 volts at 60 Hz to 60 Volts at 60 Hz. In other embodiments, the power may be converted to 90 volts at 60 Hz. One skilled in the art would recognize that conversion to numerous other voltages and/or frequencies are possible, given the methods taught herein.

At step 712, the converted power may be transmitted out via a port, such as a communication port, to a second device. In some embodiments, the power may be transmitted to a distribution tap. In other embodiments, the power may be transmitted to a signal amplifier. In some embodiments, the power may be transmitted using the center conductor of a coaxial cable.

In some embodiments, the amount of power transmitted via the communication port may be measured or otherwise quantified so that payment or other type of credit for the power supplied may be determined. In some embodiments, the amount of power supplied via the communications port may be controlled so as to not exceed a limit. In some embodiments, the limit may be based on an agreed quantity of power to supply. In other embodiments, the limit may be based on a pre-determined value for safety reasons. In still other embodiments, the limit may be based on an amount of renewable energy available, for example where the quantity supplied may be less than the amount available.

In some embodiments, the power parameter may include an indication of whether the power is from a renewable energy source, such as solar energy, wind energy, geothermal energy, bioenergy, hydropower, ocean energy, or other renewable source. In some embodiments, the power parameter may include an offer price. In other embodiments, the power parameter may include a power usage limit.

In some embodiments, power may be offered without request from the network. In other embodiments, power may be offered in response to a request from the network.

An aspect of the disclosure relates to reversing the flow of the electric power in an information delivery network and allowing users with renewable energy to direct electric power into the information delivery network so that it may be used by signal amplifiers, distribution taps and/or other devices.

In some embodiments, it may be determined that the user premises is generating more electric power than is being consumed by the premises. In these embodiments, electric power may be supplied to the information delivery network. In some embodiments, if the user premises equipment determines that there is no longer an excess of power, for example, because an appliance at the premises, such as an electric oven, may have been turned on, it may be determined to stop supplying power to the information delivery network. The user equipment may communicate to an active component upstream in the information delivery network to inform that the power supply will be, or has been, suspended.

In some embodiments, the information delivery network topography may resemble a tree with branches, with each branch leading to one or more user premises. In some embodiments, the controller 508 may communicate with other active components in the information delivery network to coordinate or participate in the coordination of power distribution within the network or to coordinate power flow to various parts of the network. For example, signal amplifiers may be positioned in neighborhoods close to user premises. If power were to be lost in a particular neighborhood while still being available in a nearby neighborhood, the active components may communicate to coordinate power sharing among neighborhoods. In some embodiments, grid power may be lost over a large area of the network while a user premises in the network may have electric power available, for example, power generated from the sun, wind or thermoelectric sources. In these embodiments, the controller may coordinate with equipment at the user premises and/or with other active components in the network to draw a quantity of power from the user premises and to distribute the power into the network for use by components in areas without grid power.

In some embodiments, the controller may limit the power to only those neighborhoods nearby. In some embodiments, when there are multiple user premises with power available, the information delivery network may draw power from one or more of them. In some embodiments, considerations may be taken to ensure that power is limited so as to not overload a part of the network or damage equipment.

In some embodiments, the network operator may determine that a particular part of the information delivery network may consume user premises provided power while another part of the network may consume grid power. For example, active components downstream of an edge resource manager may be powered by user premises provided power, while active components upstream of the edge resource manager may be powered by operator-provided power. In some embodiments, the decision may depend on the amount of power required by a part of the network such that power carried may be limited so as to not degrade performance or certain network components.

In some embodiments, an active component may draw power from the user premises in the event of an upstream failure. In these embodiments, when an active component detects a loss of power on the network, the component may signal a component downstream to begin drawing power and supplying it back upstream in the network. In some embodiments, the signaling may be automatic, for example, in the event of an outage. When an upstream power source is impacted, the active component may signal equipment at the user premises to request power.

A benefit provided by the methods described herein is that the information delivery network may be less dependent on the power grid. It may also be preferred to power the information delivery network with renewable energy.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:
   receiving, by an electronic device associated with an information delivery network and via an upstream port, first electric power, wherein the electronic device is remote from a premises;
   comparing, by the electronic device, a first metric, associated with the first electric power, with a second metric, associated with second electric power available via a downstream coaxial port, wherein the downstream coaxial port is associated with the premises;

switching, by the electronic device and based on the comparing the first metric, associated with the first electric power, with the second metric, associated with the second electric power, from receiving the first electric power via the upstream port to receiving the second electric power via the downstream coaxial port; and causing, based on receiving the second electric power via the downstream coaxial port, sending of content to the premises via the downstream coaxial port.

2. The method of claim 1, wherein the comparing comprises comparing a source of the first electric power with a source of the second electric power, and wherein the switching is further based on determining that at least a portion of the second electric power is from a renewable source.

3. The method of claim 1, further comprising:
measuring a quantity of power received via the downstream coaxial port; and
reporting, via a communication to a user device associated with the premises, the quantity of power.

4. The method of claim 1, further comprising:
providing, via the upstream port and after receiving the second electric power, a portion of the second electric power,
wherein the upstream port comprises an upstream coaxial port.

5. The method of claim 4, wherein the portion of the second electric power is limited based on one or more of a pre-configured parameter or a parameter received via a communication from the premises.

6. The method of claim 1, wherein the electronic device comprises one or more of a signal amplifier or a distribution tap.

7. The method of claim 1, further comprising charging, with the second electric power received via the downstream coaxial port, a battery of the electronic device.

8. The method of claim 1, wherein at least one of the first metric or the second metric is indicative of power availability, power quality, or power reliability.

9. The method of claim 1, further comprising:
based on the switching from receiving the first electric power via the upstream port to receiving the second electric power via the downstream coaxial port, causing a circuit associated with the electronic device to switch from being powered by the first electric power to being powered by the second electric power.

10. A method comprising:
receiving, by an electronic device associated with an information delivery network and via a first port, first electric power, wherein the electronic device is remote from a premises;
receiving, via a coaxial port, second electric power associated with the premises;
comparing a first metric associated with the first electric power with a second metric associated with the second electric power;
switching, by the electronic device and based on the comparing the first metric associated with the first electric power with the second metric associated with the second electric power, from using the first electric power to using the second electric power; and
causing, based on receiving the second electric power via the coaxial port, sending of content to the premises via the coaxial port.

11. The method of claim 10, wherein the comparing comprises comparing a source of the first electric power with a source of the second electric power, and wherein the switching is further based on determining that at least a portion of the second electric power is from a renewable source.

12. The method of claim 10, further comprising:
providing, via the first port and after receiving the second electric power, a portion of the second electric power.

13. The method of claim 10, further comprising:
providing, via the first port, a portion of the second electric power,
wherein the portion of the second electric power is limited based on one or more of a pre-configured parameter or a parameter received via a communication from the premises.

14. The method of claim 1, further comprising:
sending, to a network device, a message corresponding to coordination of power flow within a communication network and from one or more premises.

15. The method of claim 1, wherein the switching comprises switching to receiving the second electric power via a center conductor of a coaxial cable that is connected to the downstream coaxial port.

16. The method of claim 1, further comprising:
receiving, by the electronic device and from a network device, a message comprising the first metric or the second metric.

17. The method of claim 10, wherein the switching from using the first electric power to using the second electric power comprises switching from using the first electric power to power a circuit associated with the electronic device to using the second electric power to power the circuit associated with the electronic device.

18. The method of claim 10, wherein at least one of the first metric or the second metric is indicative of power availability, power quality, or power reliability.

19. A coaxial network comprising:
a distribution tap;
an amplifier; and
an electronic device associated with a first premises;
wherein the distribution tap, the amplifier, and the electronic device are connected via coaxial connections;
wherein the distribution tap is configured to:
distribute content to the first premises via a coaxial port;
receive, via a first port, first electric power;
receive, via the coaxial port, second electric power from the electronic device;
compare a first metric associated with the first electric power with a second metric associated with the second electric power;
switch, based on the comparing the first metric associated with the first electric power with the second metric associated with the second electric power, from using the first electric power to using the second electric power; and
cause, based on receiving the second electric power via the coaxial port, sending of content to the premises via the coaxial port.

20. The coaxial network of claim 19, wherein the distribution tap is further configured to send, via at least one of the coaxial connections, third electric power to the amplifier.

21. The coaxial network of claim 19, wherein the coaxial port is a first coaxial port and the first port comprises a second coaxial port.

22. The coaxial network of claim 19, wherein:
the coaxial port is a first coaxial port; and
the amplifier is configured to:
receive, via a second port, third electric power;
receive, via a second coaxial port, fourth electric power from the distribution tap; and
compare a third metric associated with the third electric power with a fourth metric associated with the fourth electric power.

23. The coaxial network of claim 19, wherein the electronic device is configured to send, via a center conductor of at least one of the coaxial connections, the second electric power to the distribution tap.

24. The method of claim 1, wherein the switching from receiving the first electric power via the upstream port to receiving the second electric power via the downstream coaxial port further comprises receiving a portion of the first electric power via the upstream port and receiving a portion of the second electric power via the downstream coaxial port.

25. The coaxial network of claim 19, wherein the distribution tap is configured to switch from using the first electric power to using the second electric power by switching from using the first electric power to power the amplifier to using the second electric power to power the amplifier.

26. The coaxial network of claim 19, wherein at least one of the first metric or the second metric is indicative of power availability, power quality, or power reliability.

\* \* \* \* \*

UNITED STATES PATENT AND TRADEMARK OFFICE
CERTIFICATE OF CORRECTION

| | |
|---|---|
| PATENT NO. | : 11,594,886 B2 |
| APPLICATION NO. | : 14/836377 |
| DATED | : February 28, 2023 |
| INVENTOR(S) | : Monnerat et al. |

It is certified that error appears in the above-identified patent and that said Letters Patent is hereby corrected as shown below:

In the Specification

Column 5, Detailed Description, Line 7:
Delete "101" and insert --109-- therefor Signed and Sealed this
Seventh Day of May, 2024

Katherine Kelly Vidal
*Director of the United States Patent and Trademark Office*